T. B. GOLDEN.
METHOD FOR RECLAIMING BROKEN ROLLS.
APPLICATION FILED FEB. 13, 1920.

1,379,975.

Patented May 31, 1921.

WITNESS:

INVENTOR.

UNITED STATES PATENT OFFICE.

THOMAS B. GOLDEN, OF POTTSVILLE, PENNSYLVANIA, ASSIGNOR TO DAVID R. KNAPP, OF POTTSVILLE, PENNSYLVANIA.

METHOD FOR RECLAIMING BROKEN ROLLS.

1,379,975.  Specification of Letters Patent.  Patented May 31, 1921.

Application filed February 13, 1920. Serial No. 358,525.

*To all whom it may concern:*

Be it known that I, THOMAS B. GOLDEN, a citizen of the United States, and a resident of Pottsville, county of Schuylkill, State of Pennsylvania, have invented certain new and useful Improvements in Methods for Reclaiming Broken Rolls, of which the following is a specification.

This invention relates to that class of devices known as rolling mill rolls such as used in a rolling mill where material is formed to shape by passing said material between the rolls while they are in motion.

During the process of rolling there are times when great strains are placed on the rolls due to the material not being hot enough, if hot material is used, or from various other causes. These excessive strains at times cause the rolls to break which results in considerable expense in replacing. The said rolls are very carefully machined and are true to form and considerable time and labor is expended in their manufacture.

It is the present custom to scrap or discard these broken rolls and it is therefore the object of this invention to provide a method whereby these can be reclaimed and placed back in service.

Figure 1:
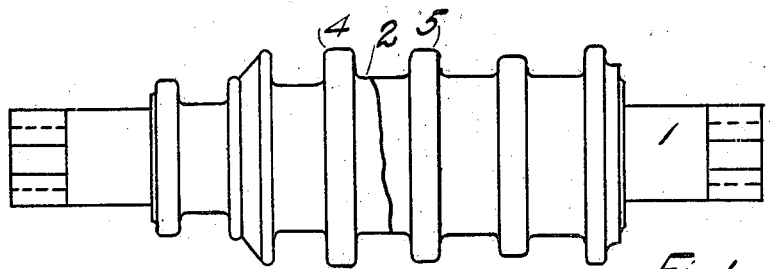
Figure 2:
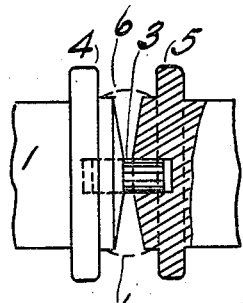

With this object in view my invention consists in a certain novel method as will hereinafter be more fully described and pointed out in the claims, reference being had to the accompanying drawing forming part of this specification and in which Figure 1 is a view of a roll and Fig. 2 is a view showing more clearly the method of accomplishing the above object. Said Fig. 2 shows part of the roll in section and only a sufficient portion to illustrate the proposed method.

Referring to the drawing in which similar numerals of reference refer to similar parts throughout the views, the numeral 1 designates a roll and the numeral 2 designates a line on which the roll is broken. This line is shown in a convenient location as it is understood that the break may occur at any place.

The numeral 3 designates a pin accurately machined and made to fit tight in a central machined aperture in the two broken pieces. This pin should be of suitable material but not necessarily of the same composition as the roll. The function of the pin is two fold, first, to hold the two parts of the roll in exact position, and second, to form and provide a base to start a weld. A solid pin plain in shape, is shown for a convenient illustration but it may be a screw or any other convenient form to hold the two parts together at or near the center of the roll.

Either before or after the pin is placed into the broken parts, the faces of these broken parts are machined away so that the groove will conform to the shape of a V as shown clearly in Fig. 2. The object of the V groove is to enable the welding electrode to reach the center of the roll to the pin for a start for a weld. It is obvious that this groove may be of a different shape depending upon the character of the break, for instance, if the break was nearly in a right angle plane to the axis of the roll only one part need be cut away to allow the welding electrode to reach the center.

The two broken parts are forced together on the pin 3 until the distance between the flanges 4 and 5 are the same as before breaking. This cavity formed by the V or removed material is now filled by means of an acetylene or electric weld up to a point well above the original surface as indicated by the dotted line 6.

After this has been done it is obvious that the roll now is a homogeneous mass. It is then centered in a lathe or a proper machine tool and the excess material at the weld is removed so that the finished part conforms to the original dimension. Having thus described my said invention what I claim as new and desire to secure by Letters Patent is:—

1. In a method for reclaiming broken rolls, consisting of facing off the face of one or both of the broken parts to form an opening to the center, securing the broken parts in rigid relation by means of a centrally located member, and then filling the opening by means of an acetylene or electric weld, and then machining the roll at the weld true to form.

2. The method of reclaiming broken rolls, which consists in mechanically uniting the meeting ends of a broken roll, and then permanently welding said ends and the uniting means to form a complete unitary roll conforming to the original roll.

3. The method of reclaiming broken rolls, which consists in fastening the meeting ends of a broken roll together in axial alinement, facing the respective ends in a predetermined manner, and subjecting said faced ends and fastening means to welding action to restore the roll.

4. The method of reclaiming broken rolls, which consists in rigidly securing the meeting ends of a broken roll together, facing one of said broken ends to form a groove between said ends, filling said groove by welding, and machining the welded parts in a predetermined manner.

In testimony whereof I have signed my name to this specification in the presence of two subscribing witnesses.

THOMAS B. GOLDEN.

Witnesses:
MARTIN L. DUNN,
CLAYTON A. HILL.